(12) United States Patent
Morczek et al.

(10) Patent No.: US 11,486,449 B2
(45) Date of Patent: Nov. 1, 2022

(54) INSIDE OUT FLEXIBLE COUPLING ASSEMBLY

(71) Applicant: Goodrich Corporation, Charlotte, NC (US)

(72) Inventors: Benjamin G. Morczek, Constableville, NY (US); Andrew Shuman, Oneida, NY (US)

(73) Assignee: Goodrich Corporation, Charlotte, NC (US)

( * ) Notice: Subject to any disclaimer, the term of this patent is extended or adjusted under 35 U.S.C. 154(b) by 332 days.

(21) Appl. No.: 16/385,878

(22) Filed: Apr. 16, 2019

(65) Prior Publication Data
US 2020/0332838 A1  Oct. 22, 2020

(51) Int. Cl.
*F16D 3/74* (2006.01)
*F16C 1/08* (2006.01)

(52) U.S. Cl.
CPC .............. *F16D 3/74* (2013.01); *F16C 1/08* (2013.01); *F16C 2326/06* (2013.01); *F16D 2300/00* (2013.01)

(58) Field of Classification Search
CPC .... F16D 3/74; F16D 2300/00; F16D 2300/12; F16D 3/72; F16C 1/08; F16C 2326/06
USPC .......................................... 464/17, 79, 80, 99
See application file for complete search history.

(56) References Cited

U.S. PATENT DOCUMENTS

| | | | | |
|---|---|---|---|---|
| 1,790,516 A | * | 1/1931 | Williams | ............... F16D 3/74 464/17 |
| 2,647,380 A | * | 8/1953 | Troeger | ............... F16D 3/72 464/99 |
| 4,265,099 A | | 5/1981 | Johnson et al. | |
| 5,000,722 A | | 3/1991 | Zilberman | |
| 8,162,762 B2 | | 4/2012 | Himmelmann | |
| 8,986,127 B2 | * | 3/2015 | Berthalon | ............... F16D 3/10 464/80 |
| 2005/0255926 A1 | | 11/2005 | Piasecki et al. | |
| 2007/0049379 A1 | | 3/2007 | Faass et al. | |
| 2012/0283029 A1 | | 11/2012 | Lawrie | |

FOREIGN PATENT DOCUMENTS

| | | | |
|---|---|---|---|
| BE | 456920 A | 7/1944 | |
| CH | 67945 | * 2/1915 | ................. 464/79 |
| DE | 39 36 680 C1 | * 2/1991 | |

OTHER PUBLICATIONS

Extended European search report issued in corresponding EP application No. 19209761.6, dated Aug. 3, 2020.

* cited by examiner

*Primary Examiner* — Greg Binda
(74) *Attorney, Agent, or Firm* — Locke Lord LLP; Joshua L. Jones; Scott D. Wofsy

(57) ABSTRACT

A flexible coupling assembly for a power transmission system includes a first circular disk defining a u-shaped radial cross-section including a first leg and a second leg connected at an inner diameter thereof circumscribing an axial bore of the flexible coupling and disconnected at an outer diameter of the first circular disk configured to connect to a first rotating member interface and a second circular disk defining a u-shaped radial cross-section including a first leg and a second leg connected at an inner diameter thereof circumscribing the axial bore of the flexible coupling and disconnected at an outer diameter of the first circular disk configured to connect to a first rotating member interface.

8 Claims, 3 Drawing Sheets

INSIDE OUT FLEXIBLE COUPLING ASSEMBLY

BACKGROUND

Technological Field

The present disclosure relates to drive shafts and flexible couplings, and more particularly to an inside out flexible coupling.

Description of Related Art

A variety of devices are known in the flexible coupling field. The conventional methods and systems have generally been considered satisfactory for their intended purpose. Traditional designs the end protrusions and adapters attach to the inner diameter of the flexible members. There is still a need in the art for a flexible coupling that is lighter and has a lower manufacturing cost. The present disclosure may provide a solution for at least one of these remaining challenges.

SUMMARY OF THE INVENTION

A flexible coupling assembly for a power transmission system includes a first circular disk and a second circular disk defining an outer diameter and an inner diameter, wherein the first circular disk and the second circular disk are connected a location on the outer diameter and disconnected at the inner diameter, wherein the first and second circular disks includes a central portion connecting the outer diameter and the inner diameter, wherein the central portion includes a narrowing section and a widening section in a radial direction away from the inner diameter. The first disk and the second disk are welded together. The first circular disk is configured to connect to a first rotating member interface, and the second circular disk is configured to connect to a second rotating member interface.

The outer diameter can be the radially outermost point of the assembly. A boundary between the first and second circular disks can include a smooth cylindrical outer surface. The connection or boundary of the first and second circular disks can include a venting through hole.

The first circular disk and the second circular disk can be surrounded by a protective sleeve.

The first circular disk can include two circular sections separated at the outer diameter and the two circular sections can be connected at a hub at the inner diameter. The first and second circular disk each include a protrusion at the outer diameter for connecting to an adjacent disk or adjacent rotating member. The circular first disk and the second circular disk can each include a U-shaped cross section. The first and second circular disks can be identical.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
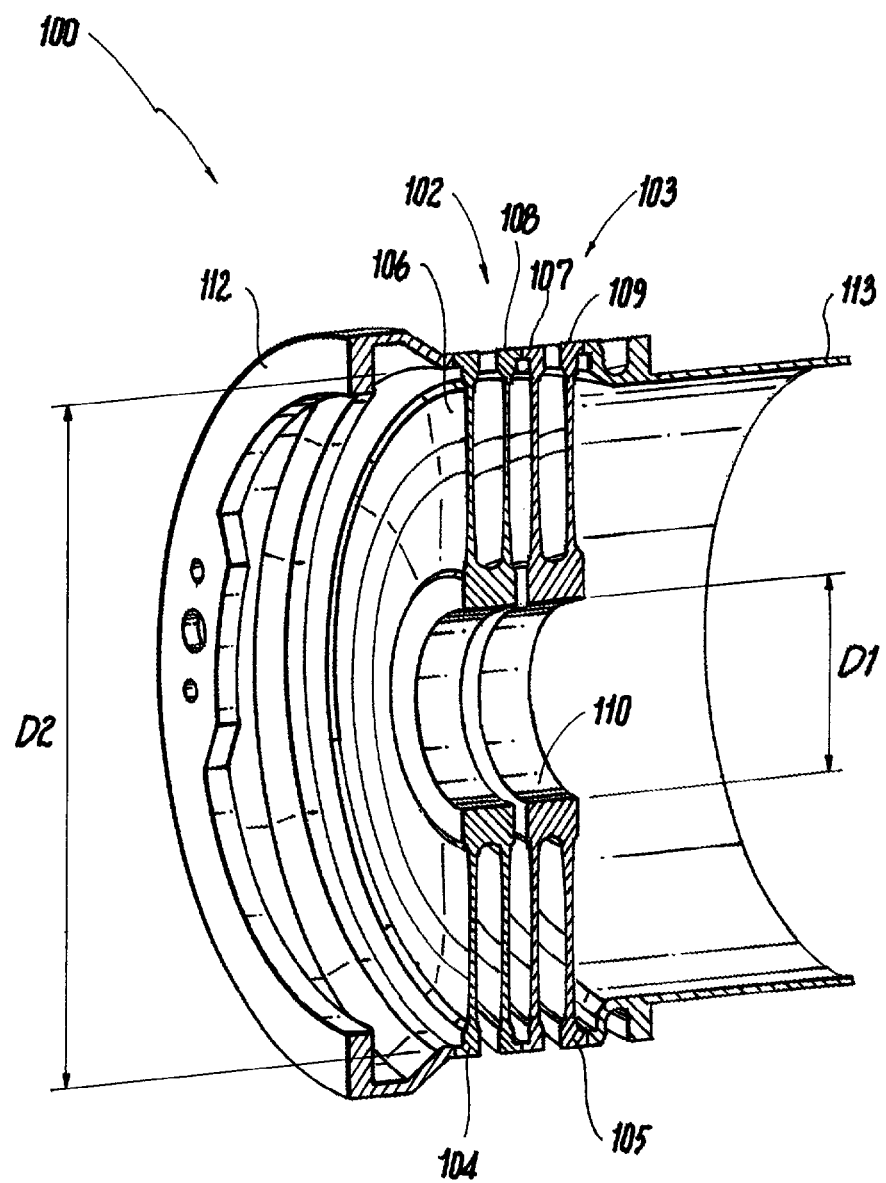
FIG. 1 is a cross section perspective view of a flexible coupling showing the profile of the disks.

Reference will now be made to the drawings wherein like reference numerals identify similar structural features or aspects of the subject invention. For purposes of explanation and illustration, and not limitation, a partial view of an exemplary embodiment of a flexible coupling in accordance with the invention is shown in FIG. 1 and is designated generally by reference character 100. Other embodiments of flexible coupling in accordance with the invention, or aspects thereof, are provided in FIGS. 2-3, as will be described. The methods and systems of the invention can be used to protect the flexible coupling in operation and to decrease the weight of the flexible coupling.

Referring to FIG. 1, the flexible coupling assembly 100 includes a first circular disk 102 defining a u-shaped radial cross-section 104 including a first leg 106 and a second leg 108 connected at an inner diameter D1 thereof circumscribing an axial bore 110 of the flexible coupling assembly 100 and disconnected at an outer diameter D2 of the first circular disk 102 configured to connect to a first rotating member interface 112, and a second circular disk 103 defining a u-shaped radial cross-section 105 including a first leg 107 and a second leg 109 connected at an inner diameter D1 thereof circumscribing the axial bore 110 of the flexible coupling assembly 100 and disconnected at an outer diameter D2 of the second circular disk 103 configured to connect to a second rotating member interface 113.

Figure 2:
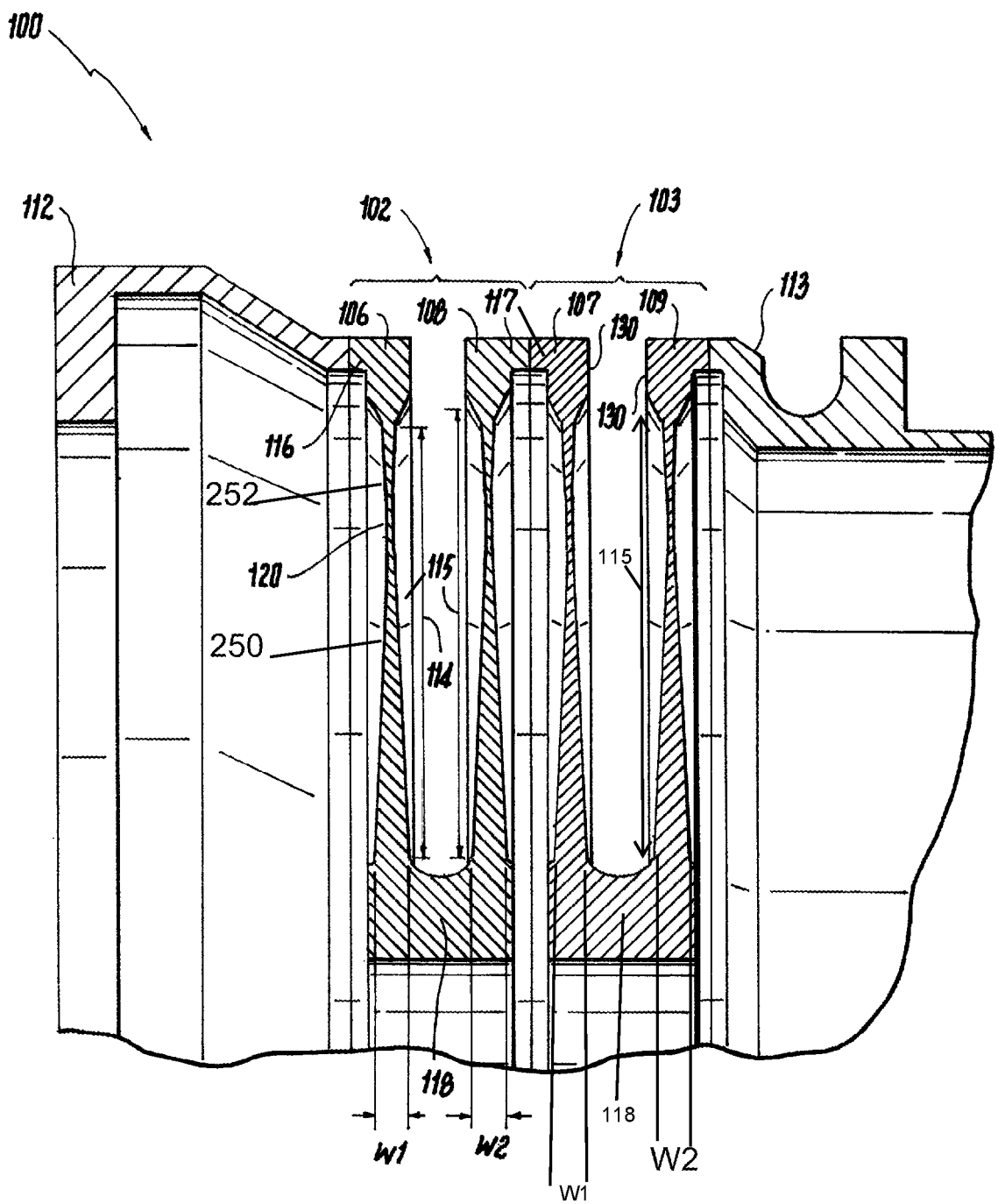
FIG. 2 is a side view of FIG. 1, showing the interaction of the disks and the rotational member interfaces.

Referring to FIG. 2, the first leg 106 and the second leg 108 of the first circular disk 102 each include a portion 114 having an axial width W1 of a cross section varying over a radial direction. The portion 114 connects a protrusion 116 located at the outer diameter D2 and a hub 118 located at the inner diameter D1 which connects the first leg 104 and the second leg 106 of the first circular disk 102. The first leg 107 and the second leg 109 of the second circular disk 103 each include a portion 115 having an axial width W2 of a cross section varying over a radial direction connecting a protrusion 117 at the outer diameter D2 and the hub 118 located at the inner diameter D1 connecting the first leg 107 and second leg 109 of the second circular disk 103.

The narrowest point 120 of each disk is approximately ⅔ of the distance from the inner diameter D2 to the outer diameter D1. The width W2 includes a narrowing section 250 and a widening section 252 in a radial direction away from the inner diameter. The first disk 102 and the second disk 103 are welded together. The first and second circular disks can be identical. It is also conceived the disks can include different profiles based on the design requirements. The U-shaped disks can be manufactured using conventional machining then mated together by welding.

As shown further in FIG. 2, the outer diameter D2 of the assembly 100, is flush with at least one of the attached interfaces 112, 113. The outer diameter D2 of the assembly is flush with both the first rotating member interface 112 and the second rotating member interface 113. An important feature of this disclosure is having the critical areas of the first circular disk 102 and the second circular disk 103 be enclosed and protected by the protrusions 116 and 117 extending in an axial direction. An outer surface of each protrusion 116/117 is defined by an equal outer diameter. Each of the disks include two protrusions, for attaching to either the adjacent disk or to the adjacent interface. The protrusions ensure that debris or tools do not strike the flexible members. A reinforcing section 130 is included at the outermost portion of each disk, ensuring that all flexing within the disks is accommodated within the profile and not the welded joints. The reinforcing section is wider than the rest of the portion connecting the hubs and protrusions.

Figure 3:
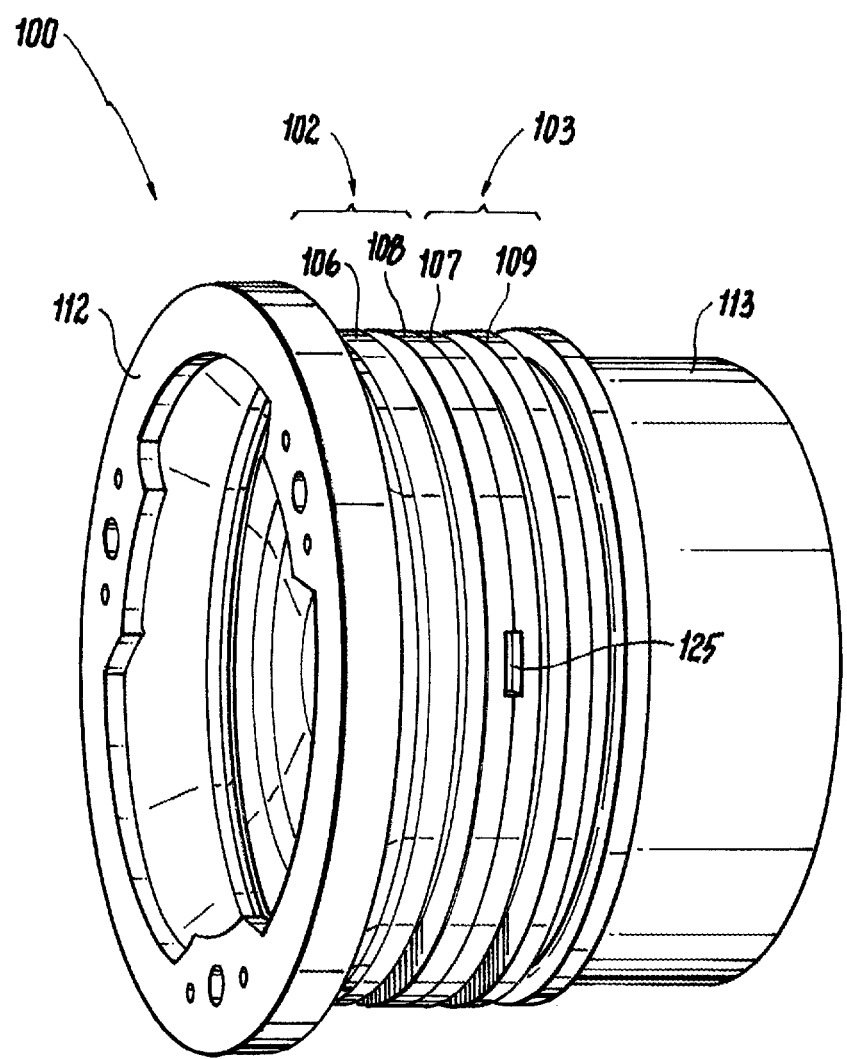
FIG. 3 is a perspective view of the outside of FIG. 1, showing the outer surface of the flexible coupling.

Shown in FIG. 3, a boundary between the first 102 and second 103 circular disks includes a smooth cylindrical outer surface. The connection or boundary of the first and second circular disks includes a venting through holes 125. The venting holes 125 can be evenly spaced around the circumference of the disks 102, 103. The venting holes 125 ensure that gasses and liquids are not trapped and do not cause further stresses or corrosion on the inner portion of the flexible shaft.

The methods and systems of the present disclosure, as described above and shown in the drawings, provide for flexible power transmission shafts with superior properties including increased manufacturability, reliability, and protection, and reduced size, weight, complexity, and cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A flexible coupling assembly for a power transmission system comprising:
    a first circular disk defining a u-shaped radial cross-section including a first leg and a second leg connected at an inner diameter thereof circumscribing an axial bore of the flexible coupling and disconnected at an outer diameter of the first circular disk configured to connect to a first rotating member interface; and
    a second circular disk defining a u-shaped radial cross-section including a first leg and a second leg connected at an inner diameter thereof circumscribing the axial bore of the flexible coupling and disconnected at an outer diameter of the second circular disk configured to connect to a second rotating member interface;
    wherein the first leg and the second leg of the first circular disk each include a portion having an axial width of a cross section varying over a radial direction connecting an axial protrusion at the outer diameter and a hub connecting the first leg and second leg of the first circular disk located at the inner diameter
    wherein the first leg and the second leg of the second circular disk each include a portion having an axial width of a cross section varying over a radial direction connecting an axial protrusion at the outer diameter and a hub connecting the first leg and second leg of the second circular disk located at the inner diameter, and
    wherein an outer surface of a meeting point of the first and second circular disk is defined by a weld defining an outermost surface and at least one through hole going through the outer surface for ventilation of the assembly; and
    wherein an outer surface of each protrusion is defined by an equal outer diameter, and
    wherein a most narrow section of the first and second disks is at ⅔ distance from the inner diameter to the outer diameter.

2. The flexible coupling assembly of claim 1, wherein the portion having an axial width of a cross section varying over a radial direction of each leg includes a narrowing section and a widening section in a radial direction away from the inner diameter.

3. The flexible coupling assembly of claim 1, wherein the protrusion of each leg is configured to connect to a feature of the flexible coupling assembly adjacent to each relative circular disk.

4. The flexible coupling assembly of claim 3, wherein the protrusion of first leg of the first circular disk is configured to connect at the outer diameter to the first rotating member interface, and the protrusion of the second leg of the first circular disc is configured to be welded to the protrusion of the first leg of the second circular disk.

5. The flexible coupling assembly of claim 4, wherein the second leg of second circular disk is configured to connect at the outer diameter to the second rotating member interface.

6. The coupling assembly of claim 1, wherein the outer diameter of the first circular disk is the radially outermost point of the assembly.

7. The coupling assembly of claim 1, wherein the meeting point between the first circular disk and the second circular disk includes a smooth cylindrical surface that is included in the outer surface referred to in claim 1.

8. The coupling assembly of claim 1, wherein the first and second disks are identical.

\* \* \* \* \*